United States Patent [19]

Lönhoff et al.

[11] Patent Number: 5,250,274
[45] Date of Patent: Oct. 5, 1993

[54] PROCESS FOR THE PRODUCTION OF SODIUM DICHROMATE

[75] Inventors: Norbert Lönhoff; Bernhard Spreckelmeyer; Hans-Dieter Block; Rainer Weber, all of Leverkusen; Jost Halstenberg, Cologne; Bernd Rosenow, Leverkusen, all of Fed. Rep. of Germany

[73] Assignee: Bayer Aktiengesellschaft, Leverkusen, Fed. Rep. of Germany

[21] Appl. No.: 824,682

[22] Filed: Jan. 21, 1992

Related U.S. Application Data

[63] Continuation of Ser. No. 686,226, Apr. 16, 1991, abandoned.

[30] Foreign Application Priority Data

Apr. 26, 1990 [DE] Fed. Rep. of Germany ....... 4013335

[51] Int. Cl.$^5$ ............................................ C01G 37/00
[52] U.S. Cl. ...................................... 423/61; 423/54; 423/55; 423/597; 423/596; 423/595
[58] Field of Search ...................... 423/53, 55, 60, 61, 423/595, 597, 596; 204/89

[56] References Cited

U.S. PATENT DOCUMENTS

| | | |
|---|---|---|
| 2,612,435 | 9/1952 | Perrin et al. ........................... 423/66 |
| 2,931,704 | 4/1960 | Hoekje ................................. 423/597 |
| 3,933,972 | 1/1976 | Bauwens et al. ...................... 423/57 |
| 4,162,295 | 7/1979 | Subbanna et al. .................... 423/61 |
| 4,168,240 | 9/1979 | Bockelmann et al. ............. 252/8.57 |
| 4,171,248 | 11/1979 | Carlin ................................. 423/596 |
| 4,215,989 | 8/1980 | Cartier ................................. 8/94.27 |
| 4,244,925 | 1/1981 | Subbanna et al. .................... 423/61 |
| 4,340,571 | 7/1982 | Cartier ................................. 423/53 |
| 4,528,175 | 7/1985 | Walther et al. ..................... 423/492 |
| 4,966,760 | 10/1990 | Ladd et al. ........................... 423/53 |
| 4,968,503 | 11/1990 | Glissman ............................. 423/55 |

OTHER PUBLICATIONS

CRC Handbook of Chemistry and Physics 54th Edition, p. B-137, 1973-1974.
92:44022n, Macarovici et al, "Conversion of sodium chromate to sodium dichromate", Chem. Abs. V. 92 (Feb. 1980), p. 120.

Primary Examiner—Theodore Morris
Assistant Examiner—Edward Squillante
Attorney, Agent, or Firm—Sprung Horn Kramer & Woods

[57] ABSTRACT

The invention relates to a process for the production of sodium dichromate and sodium dichromate solutions by oxidative roasting of chrome ores under alkaline conditions, leaching of the furnace clinker obtained with water or an aqueous chromate-containing solution, adjustment of the pH to from 7 to 9.5, removal of the insoluble constituents by filtration, a sodium monochromate solution being obtained, conversion of the monochromate ions of this solution into dichromate ions by acidification and crystallization of sodium dichromate by concentration of this solution, characterized in that the acidification is carried out with carbon dioxide under pressure with removal of sodium hydrogen carbonate, the remaining solution is then very largely freed from sodium monochromate by cooling to a temperature below 10° C. and filtration, any monochromate ions still present in the remaining solution are converted into dichromate ions by addition of an acid and the sodium monochromate filtered off is added to the sodium monochromate solution before conversion with carbon dioxide into a sodium dichromate solution.

3 Claims, 1 Drawing Sheet

PROCESS FOR THE PRODUCTION OF SODIUM DICHROMATE

This application is a continuation of application Ser. No. 686,226, filed Apr. 16, 1991, now abandoned.

BACKGROUND OF THE INVENTION

This invention relates to a process for the production of sodium dichromate and sodium dichromate solutions.

According to Winnacker-Küchler, Chemische Technologie, Vol. 2, 4th Edition, 1982, pp. 657–664. sodium dichromate is produced by roasting of chrome ore with soda ash and/or sodium hydroxide and atmospheric oxygen under alkaline conditions.

A sodium monochromate solution containing from 300 to 500 g/l $Na_2CO_4$ is obtained by leaching the furnace clinker leaving the roasting furnace with water or a chromate containing aqueous solution, adjusting the pH value of the mash from 7 to 9.5 and removing the insoluble constituents by filtration. The pH value is generally adjusted with sulfuric acid and/or with sodium dichromate solution. To produce sodium dichromate, the monochromate ions of the solution are converted into dichromate ions either by acidification with sulfuric acid, by acidification with carbon dioxide under pressure or by electrolytic acidification. Where sulfuric acid is used for acidification, sodium sulfate is formed and precipitates when the solution is concentrated to approximately 70% by weight $Na_2Cr_2O_7.2H_2O$. The chromate-containing sodium sulfate obtained has to be worked up.

For acidification with carbon dioxide, the sodium monochromate solution is adjusted to a concentration of from 750 to 1,000 g/l $Na_2CrO_4$ and is saturated with carbonic acid in autoclaves by introduction of carbon dioxide under a pressure of from 0.5 to 1.5 MPa (5 to 15 bar). 75 to 95% conversion of monochromate ions into dichromate ions is obtained with precipitation of sodium hydrogen carbonate. The remaining conversion to 100% can be obtained by introduction of carbon dioxide in another stage after concentration to 1,300 g/l $Na_2CrO_4$ (already formed $Na_2Cr_2O_7.2H_2O$ expressed in $Na_2CrO_4$ equivalents). On an industrial scale, however, this final conversion step is very complicated. The final conversion step may also be carried out with sulfuric acid or by electrolysis.

As mentioned above, chromate-containing sodium sulfate is formed during the reaction with sulfuric acid and has to be worked up.

Electrolytic acidification is carried out by introduction of the sodium monochromate solution or rather the sodium monochromate solution converted to a level of from 75 to 95% into sodium dichromate into the anode compartments of electrolysis cells equipped with cation exchanger membranes. During the electrolysis process, sodium ions migrate through the membrane into the cathode compartments of the cells filled with water or with an aqueous solution. The sodium ions form an aqueous solution containing sodium hydroxide with the hydroxide ions formed at the cathode with simultaneous evolution of hydrogen. In the anode compartment, the chromate ions are converted into dichromate ions by the hydrogen ions formed at the anode with simultaneous evolution of oxygen. This process is also difficult to carry out on an industrial scale.

To produce sodium dichromate crystals, the sodium dichromate solutions obtainable in the processes mentioned above are concentrated by evaporation of water. The sodium dichromate which crystallizes is separated off and dried.

Now, the present invention adopts a different, simple approach to the production of sodium dichromate solutions and sodium dichromate crystals which does not have any of the disadvantages of the processes described above.

SUMMARY OF THE INVENTION

The present invention relates to a process for the production of sodium dichromate and sodium dichromate solutions by roasting of chrome ores under alkaline conditions, leaching of the furnace clinker obtained with water or an aqueous chromate-containing solution, adjustment of the pH to from 7 to 9.5, removal of the insoluble constituents by filtration, a sodium monochromate solution being obtained, conversion of the monochromate ions of this solution into dichromate ions by acidification and crystallization of sodium dichromate by concentration of this solution, characterized in that the acidification is carried out with carbon dioxide under pressure with removal of sodium hydrogen carbonate, the remaining solution is then very largely freed from sodium monochromate by cooling to a temperature below 10° C. and filtration, any monochromate ions still present in the remaining solution are converted into dichromate ions by addition of an acid and the sodium monochromate filtered off is added to the sodium monochromate solution before conversion with carbon dioxide into a sodium dichromate solution.

The solution remaining after acidification with carbon dioxide under pressure and removal of sodium hydrogen carbonate is preferably cooled to temperatures of from 0° to −25° C. and, more preferably, to temperatures of from −10° to −20° C. It is of advantage to concentrate the sodium monochromate solution to contents of from 500 to 1,000 g/l $Na_2CrO_4$ before acidification and to carry out the acidification with carbon dioxide under pressure to a degree of acidification of the monochromate ions into dichromate ions of from 40 to 95%. Although degrees of acidification of less than 40% are possible, they do lead to very large recirculation volumes which make the process difficult to carry out on an industrial scale.

DESCRIPTION OF THE PREFERRED EMBODIMENTS

In one particularly preferred embodiment of the process according to the invention, the sodium monochromate solution is concentrated before acidification to contents of from 750 to 1,000 g/l $Na_2CrO_4$ and the acidification with carbon dioxide under pressure is carried out to a degree of acidification of the monochromate ions into dichromate ions of from 80 to 95%.

Solutions in which up to 99% of the chromate ions of the solution are present as dichromate ions are obtained by acidification of sodium monochromate solutions with carbon dioxide under pressure and cooling of the solution after removal of sodium hydrogen carbonate to temperatures below 10° C. and filtration of precipitated sodium monochromate. Solutions such as these, which only contain minimal residues of sodium monochromate, can be used in numerous production processes, such as the electrolytic production of chromic acid, the production of chrome tanning materials and in the oxidation of organic compounds.

For the production of sodium dichromate solutions, in which all the chromate ions are present as dichromate ions, and for the production of sodium dichromate crystals, the remaining monochromate ions of the solution may be converted into dichromate ions either with an acid or by electrolysis. The monochromate ions still present after cooling and filtration are preferably converted by addition of chromic acid and/or a solution containing chromic acid. Suitable chromic acid solutions are obtained, for example, in the electrolytic production of chromic acid.

Figure 1:
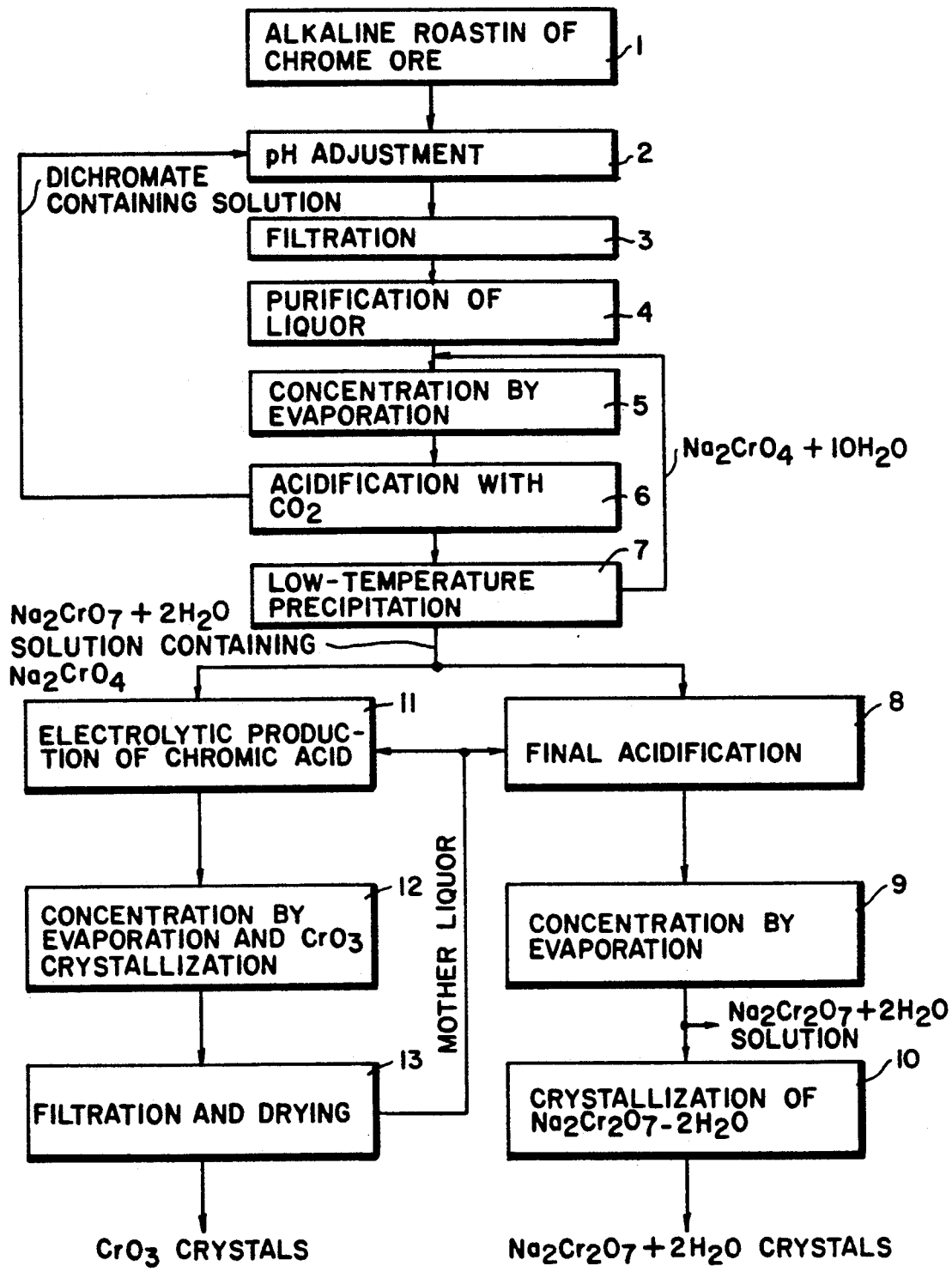
FIG. 1 of the drawing is a flowchart that shows the sequence of steps of the process of the present invention.

The process according to the invention is described in the following with reference to FIG. 1. The variant of the process according to the invention illustrated in FIG. 1 represents a particularly advantageous embodiment.

Chrome ore is digested by oxidative roasting with soda ash and atmospheric oxygen at from 1,000° to 1,100° C. under alkaline conditions in the presence of a carrier material in a rotary kiln (1). The furnace clinker formed is then leached with water or dilute chromate solution and adjusted with sodium dichromate solution to a pH value of from 7 to 9.5 (2). Soluble alkali compounds of iron, aluminium and silicon are thus converted into insoluble and readily filterable hydroxides or oxide hydrates which are removed together with the insoluble constituents of the furnace clinker (3). The sodium monochromate solution formed, which contains from 300 to 500 g/l $Na_2CrO_4$, is then freed from dissolved vanadate by addition of calcium oxide at pH values of from 10 to 13, as described in EP-A-47 799. The solution, which now contains calcium, is freed from most of the alkaline earth metal ions and other polyvalent cations by precipitation as carbonates through the addition of, or in situ formation of, sodium carbonate (4). Precipitation is preferably carried out at temperatures of from 50° to 100° C., at pH values of from 8 to 12 and with an approximately 2 to 10-fold molar carbonate excess, based on the quantity of alkaline earth metal ions. A sodium monochromate solution freed from polyvalent cations to a total content of less than 5 mg/l is obtained after filtration. The content of polyvalent cations in this solution can be even further reduced by means of suitable selective cation exchangers. The sodium monochromate solution is then concentrated to contents of from 750 to 1,000 g/l of $Na_2CrO_4$ (5) by evaporation in one or more stages.

In the now concentrated solution, a pH value below 6.5 is established by introduction of carbon dioxide in one or more stages to a final pressure of from 0.5 to 1.5 MPa (5–15 bar) at a final temperature not exceeding 50° C., an 80 to 95% conversion of the sodium monochromate into sodium dichromate being obtained in this way with precipitation of sodium hydrogen carbonate (6). Carbon dioxide may be introduced in gaseous or liquid form.

The sodium hydrogen carbonate is removed from the suspension formed under continuing carbon dioxide pressure or, after expansion, the sodium hydrogen carbonate is quickly removed before its back-reaction with the sodium dichromate.

The sodium hydrogen carbonate removed is calcined at from 200° to 300° C., optionally with addition of sodium hydroxide, to form soda ash which is fed to the roasting of the chrome ore (1).

After removal of a sidestream for pH adjustment of the leached furnace clinker, the resulting sodium monochromate/sodium dichromate solution separated from the sodium hydrogen carbonate is then cooled to −10° to −20° C. in one or more stirrer-equipped vessels and, after a residence time of 5 to 60 minutes, is freed from the sodium monochromate accumulating by filtration (7). Sodium dichromate solutions in which 97 to 99% of the chromate is present as dichromate are obtained. The sodium monochromate filtered off is then concentrated by evaporation (5), optionally after addition of water, before the pH adjustment (2).

The sodium monochromate filtered off, optionally after washing and drying, may also be used as such, for example for the production of corrosion inhibitors.

To avoid the accumulation of impurities, particularly sulfate ions, it may be advisable to deliver part of the sodium monochromate filtered off to the final acidification stage (8). It has proved to be of particular advantage in this connection to use low-sulfur fuels, preferably natural gas, in the roasting of the chrome ore (1).

The sodium monochromate/sodium dichromate solution may be cooled by standard methods of the type described, for example, in "Ullmanns Encyklopädie der Technischen Chemie", 4th Edition, Vol. 3, pages 186 to 218, Verlag Chemie, Weinheim, 1973. If liquid carbon dioxide is used for acidification, it is advisable to cool the solution either directly or indirectly through a heat exchanger using a suitable heat exchange medium by evaporation of carbon dioxide.

Part of the solution obtained during cooling (7) is used for the electrolytic production of chromic acid (11) or another application. The other part is converted with mother liquor containing chromic acid from the chromic acid filtration stage (13), with solid chromic acid or with chromic acid solution into a sodium dichromate solution in which all the chromate ions are present as dichromate ions (8) This solution is then used either as such or after concentration by evaporation to from 60 to 70% by weight $Na_2Cr_2O_7 \cdot H_2O$ (9).

For the production of sodium dichromate crystals, the solution is concentrated to approximately 1,650 g/l $Na_2Cr_2O_7 \cdot H_2O$ with precipitation of sodium dichromate which is removed from the solution by filtration (10).

In the electrolytic production of chromic acid, the sodium dichromate/sodium monochromate solution is converted into a solution containing chromic acid by multistage electrolysis at from 50° to 90° C. in two-compartment electrolysis cells with cation-selective membranes are partitions (11). The electrolysis is carried out by introduction of the solution mentioned into the anode compartment of the first stage. After partial conversion of the dichromate into chromic acid, the solution then flows into the second stage, in which it undergoes further partial conversion into chromic acid, and so on to the last stage in which a degree of conversion of the dichromate into chromic acid of from 55 to 70% is achieved, corresponding to a molar ratio of sodium ions to chromic acid of from 0.45:0.55 to 0.30:0.70. Although there may be any number of stages, 6- to 15-stage electrolysis is preferred.

The solution containing chromic acid formed during electrolysis and residual sodium dichromate is concentrated by evaporation to a water content of approximately 12 to 22% by weight water at temperatures of from 55° to 110° C., most of the chromic acid crystallizing out (12). The suspension formed is then separated by centrifugation at from 50° to 110° C. into a solid consisting essentially of crystalline chromic acid and a liquid phase hereinafter referred to as the mother liquor (13).

The mother liquor obtained, optionally after dilution with water, is returned to the electrolysis process at a suitable point, i.e. at a stage in which the dichromate conversion is similar. To avoid a heavy accumulation of impurities in the system, part of the mother liquor is removed and used in the final acidification (8). The crystalline chromic acid is freed from adhering mother liquor by single or repeated washing with from 10 to 50% by weight, based on the weight of the solid, of saturated or substantially saturated chromic acid solution and by centrifugation after each wash. The washed pure chromic acid crystals may then be used for the intended purpose either as such or after drying.

The process according to the invention is illustrated by the following Examples.

EXAMPLES

GENERAL COMMENTS

Sodium dichromate/sodium monochromate solutions prepared by dissolution of sodium dichromate and sodium monochromate were used in Examples 1 to 5. The compositions of the solutions corresponded to those in which they can be present in the industrial production of sodium dichromate after acidification with carbon dioxide under pressure. A partly acidified sodium dichromate solution obtained in an industrial process after acidification with carbon dioxide was used in Example 6. The solutions were cooled in an electrically operated laboratory cryostat.

In Examples 1 to 5, quantities of 50 ml were cooled to the temperatures shown, kept at those temperatures for 60 minutes and then filtered through a cooled glass frit.

EXAMPLE 1

A solution having the following composition was cooled to temperatures down to $-25°$ C. and worked up as described.

| Composition of the solution: | |
|---|---|
| Total chromate content of the solution (in $Na_2CrO_4$ equivalents): | 60.1% by weight = 900 g/l |
| $Na_2Cr_2O_7.2H_2O$: | 46.7% by weight |
| $Na_2CrO_4$: | 9.3% by weight |
| Degree of acidification*): | 84.5% |

*)The so-called degree of acidification indicates the percentage of the total chromate content, expressed as $Na_2CrO_4$ equivalents, which is present as dichromate.

The results of the test are shown in Table 1.

TABLE 1

| Temperature | Concentration $Na_2Cr_2O_7.2H_2O$ | Concentration $Na_2CrO_4$ | Degree of acidification |
|---|---|---|---|
| 11° C. | Beginning of $Na_2CrO_4$ crystallization | | |
| −5° C. | 53.6% by weight | 3.3% by weight | 94.7% |
| −10° C. | 55.2% by weight | 2.0% by weight | 96.8% |
| −15° C. | 56.2% by weight | 1.1% by weight | 98.3% |
| −20° C. | 58.6% by weight | 1.0% by weight | 98.3% |
| −25° C. | 59.0% by weight | 1.1% by weight | 98.3% |

EXAMPLE 2

A solution having the following composition was cooled to temperatures down to $-25°$ C. and worked up as described.

| Composition of the solution: | |
|---|---|
| Total chromate content of the solution (in $Na_2CrO_4$ equivalents): | 59.3% by weight = 874 g/l |
| $Na_2Cr_2O_7.2H_2O$: | 48.9% by weight |
| $Na_2CrO_4$: | 6.1% by weight |
| Degree of acidification: | 89.7% |

The results of the test are shown in Table 2.

TABLE 2

| Temperature | Concentration $Na_2Cr_2O_7.2H_2O$ | Concentration $Na_2CrO_4$ | Degree of acidification |
|---|---|---|---|
| 7° C. | Beginning of $Na_2CrO_4$ crystallization | | |
| −5° C. | 53.5% by weight | 2.5% by weight | 95.9% |
| −10° C. | 53.9% by weight | 1.7% by weight | 97.3% |
| −15° C. | 55.2% by weight | 1.1% by weight | 98.2% |
| −20° C. | 54.4% by weight | 1.1% by weight | 98.2% |
| −25° C. | 57.1% by weight | 0.7% by weight | 98.9% |

EXAMPLE 3

A solution having the following composition was cooled to $-20°$ and $-25°$ C. and worked up as described.

| Composition of the solution: | |
|---|---|
| Total chromate content of the solution (in $Na_2CrO_4$ equivalents): | 62.7% by weight = 892 g/l |
| $Na_2Cr_2O_7.2H_2O$: | 48.7% by weight |
| $Na_2CrO_4$: | 9.8% by weight |
| Degree of acidification: | 84.4% |

The results are shown in Table 3.

TABLE 3

| Temperature | Concentration $Na_2Cr_2O_7.2H_2O$ | Concentration $Na_2CrO_4$ | Degree of acidification |
|---|---|---|---|
| 10° C. | Beginning of $Na_2CrO_4$ crystallization | | |
| −20° C. | 54.0% by weight | 1.2% by weight | 98.0% |
| −25° C. | 57.1% by weight | 0.6% by weight | 99.1% |

EXAMPLE 4

A solution having the following composition was cooled to $-15°$, $-20°$ and $-25°$ C. and worked up as described.

| Composition of the solution: | |
|---|---|
| Total chromate content of the solution (in $Na_2CrO_4$ equivalents): | 54.0% by weight = 765 g/l |
| $Na_2Cr_2O_7.2H_2O$: | 44.4% by weight |
| $Na_2CrO_4$: | 5.7% by weight |
| Degree of acidification: | 89.4% |

The results of the test are shown in Table 4.

TABLE 4

| Temperature | Concentration $Na_2Cr_2O_7.2H_2O$ | Concentration $Na_2CrO_4$ | Degree of acidification |
|---|---|---|---|
| 0° C. | Beginning of $Na_2CrO_4$ crystallization | | |
| −15° C. | 48.5% by weight | 1.9% by weight | 96.6% |
| −20° C. | 47.5% by weight | 1.2% by weight | 97.7% |
| −25° C. | 55.2% by weight | 1.1% by weight | 98.2% |

EXAMPLE 5

A solution having a total chromate content of 42.7% by weight = 563 g/l (expressed in $Na_2CrO_4$ equivalents) and a degree of acidification of 49.1% was cooled to −12° C. and worked up as described. The results are shown in Table 5.

TABLE 5

| | Concentration $Na_2Cr_2O_7.2H_2O$ | Concentration $Na_2CrO_4$ | Degree of acidification |
|---|---|---|---|
| Solution before cooling | 19.3% by weight | 21.7% by weight | 49.1% |
| Solution after cooling to −12° C. and filtration | 33.2% by weight | 4.7% by weight | 88.5% |

The crystallization of $Na_2CrO_4$ began at 10° C. The solution solidified on cooling to below 13° C.

EXAMPLE 6

Quantities of 200 ml of a 93% acidified technical sodium dichromate solution having the following composition were cooled to 0°, −10°, −15° and −20° C., stirred for 1 hour and filtered through a cooled glass frit.

| Composition of the solution: | |
|---|---|
| Total chromate content of the solution (in $Na_2CrO_4$ equivalents): | 63.9% by weight = 990 g/l |
| $Na_2Cr_2O_7.2H_2O$: | 54.7% by weight |
| $Na_2CrO_4$: | 4.5% by weight |

The results of the test are shown in Table 6.

TABLE 6

| Temperature | Concentration $Na_2Cr_2O_7.2H_2O$ | Concentration $Na_2CrO_4$ | Degree of acidification |
|---|---|---|---|
| 0° C. | 57.0% by weight | 2.6% by weight | 96.0% |
| −5° C. | 57.7% by weight | 2.0% by weight | 96.9% |
| −10° C. | 59.4% by weight | 1.3% by weight | 98.0% |
| −15° C. | 59.8% by weight | 1.0% by weight | 98.5% |
| −20° C. | 60.2% by weight | 0.7% by weight | 98.9% |

It is understood that the specification and examples are illustrative but not limitative of the present invention and that other embodiments within the spirit and scope of the invention will suggest themselves to those skilled in the art.

What is claimed is:

1. A process for the production of sodium dichromate and sodium dichromate solutions from chromes ores by
   A) oxidative roasting of chrome ores under alkaline conditions in a roasting furnace to produce furnace to produce furnace clinker,
   B) leaching of the furnace clinker leaving the roasting furnace with water or an aqueous chromate-containing solution,
   C) adjustment of the pH to from 7 to 9.5 by addition of sodium dichromate solution,
   D) removal of insoluble constituents by filtration, thereby obtaining a sodium monochromate solution,
   E) concentration the solution from step D) to a content of 750 to 1000 g/l of sodium monochromate by subjecting said solution to an evaporation step,
   F) conversion of 40–95% of the monochromate ions of this solution into dichromate ions by acidification with carbon dioxide under pressure with removal of sodium hydrogen carbonate,
   G) cooling the solution obtained from step F) to a temperature below 10° C., thereby precipitating sodium monochromate,
   H) filtering off the precipitated sodium monochromate and yielding said sodium dichromate solution and
   I) returning the precipitated sodium monochromate to step F).

2. A process according to claim 1, wherein the cooling is carried out to temperatures of from −10° to −20° C.

3. A process according to claim 1, wherein chromic acid is added to the solution from step H) to convert any monochromate ions to dichromate ions.

* * * * *